United States Patent [19]

Ehresmann

[11] 4,249,501
[45] Feb. 10, 1981

[54] FUEL SYSTEM FOR INTERNAL COMBUSTION ENGINES

[76] Inventor: Ewald Ehresmann, Manly, Iowa 50456

[21] Appl. No.: 64,051

[22] Filed: Aug. 6, 1979

[51] Int. Cl.³ .............................................. F02M 31/00
[52] U.S. Cl. .................................... 123/552; 123/557
[58] Field of Search ............... 123/122 E, 122 H, 133, 123/122 AA, 122 A; 261/145, 144

[56] References Cited

U.S. PATENT DOCUMENTS

| | | | |
|---|---|---|---|
| 1,319,718 | 10/1919 | Martin | 123/122 H |
| 2,103,947 | 12/1937 | Holmes | 123/122 H |
| 2,104,974 | 1/1938 | Dawes | 123/122 H |
| 2,733,698 | 2/1956 | Voigt | 123/133 |

Primary Examiner—Ronald H. Lazarus
Attorney, Agent, or Firm—Zarley, McKee, Thomte, Voorhees & Sease

[57] ABSTRACT

A fuel system for internal combustion engines includes a fuel pump for supplying fuel to a carburetor through a fuel line and a heater for heating the fuel line at a position intermediate the fuel pump and carburetor for vaporizing and preheating the fuel prior to introduction into the carburetor. An adjustable air orifice is provided on the fuel line upstream of the heater. A bypass fuel line, which is connected to the fuel line upstream of the air orifice, provides direct communication to the carburetor when the engine is cold but includes a thermally controlled valve thereon which is operatively associated with the heater for closing the valve when the heater temperature is above a predetermined value and opening the valve when the heater temperature is below the predetermined temperature. The thermally controlled valve has an orifice therethrough which is adapted to provide limited fuel flow therethrough in both the closed and open positions for the valve.

10 Claims, 3 Drawing Figures 4,249,501

FUEL SYSTEM FOR INTERNAL COMBUSTION ENGINES

BACKGROUND OF THE INVENTION

The present invention relates generally to fuel systems for internal combustion engines and more particularly to an improved fuel system which vaporizes and preheats fuel prior to introduction into the carburetor while simultaneously affording a ready source of raw fuel upon demand from the carburetor such as when an automobile starts from a stopped position or accelerates.

It has previously been recognized that fuel burns more efficiently in an internal combustion engine if it is vaporized and preheated prior to combustion. Accordingly, numerous accessories, attachments and modifications for fuel systems have been provided. Such devices, however, have generally been directed solely to increasing the efficiency of combustion without otherwise effecting the rate of fuel consumption of the engine. Other devices have been proposed for cutting the fuel consumption of an internal combustion engine but these generally do not provide a preheating of the fuel and often result in significant power loss for the engine.

Accordingly, a primary object of the invention is to provide an improved fuel system for an internal combustion engine.

A further object is to provide a fuel system wherein fuel is vaporized and preheated prior to introduction to the carburetor.

A further object is to provide a fuel system which effects a reduction in the rate of fuel consumption of an engine without significant power loss.

Another object is to provide a fuel system including a main fuel line in which fuel is vaporized and preheated as well as a bypass line wherein raw fuel is available upon demand for starting, accelerating and the like.

Another object is to provide a fuel system wherein the flow rate of fuel therethrough is adjustable.

Finally, an object is to provide a fuel system which is simple in construction, automatic and efficient in operation and easily installed on existing engines.

SUMMARY OF THE INVENTION

The fuel system of the present invention includes in addition to a conventional fuel pump for supplying fuel to a carburetor through a fuel line, a heater for heating the fuel line at a position intermediate the fuel pump and carburetor for vaporizing and preheating the fuel before it is introduced into the carburetor. The fuel line is also provided with an adjustable air orifice upstream of the heater for controlling the speed of fuel flow through the heater and ultimately controlling the rate of fuel consumption of the engine.

A bypass fuel line has one end in communication with the fuel line upstream of the air orifice and an opposite end in communication with the carburetor for supplying fuel thereto. A thermally controlled valve is interposed along the bypass fuel line, which valve is in thermal communication with the heater so as to close when the temperature of the heater is above a predetermined temperature and to open when the heater temperature is below the predetermined temperature. Accordingly, a direct source of fuel is provided through the bypass fuel line when the engine is cold prior to attaining its operating temperature. Even when the thermally controlled valve is closed, an orifice therethrough affords a supplemental source of fuel for the engine upon demand from the carburetor such as when accelerating or resisting sudden loads. The bypass fuel line may also be directed through the heater for increased fuel efficiency.

DESCRIPTION OF THE PREFERRED EMBODIMENT

Figure 1:
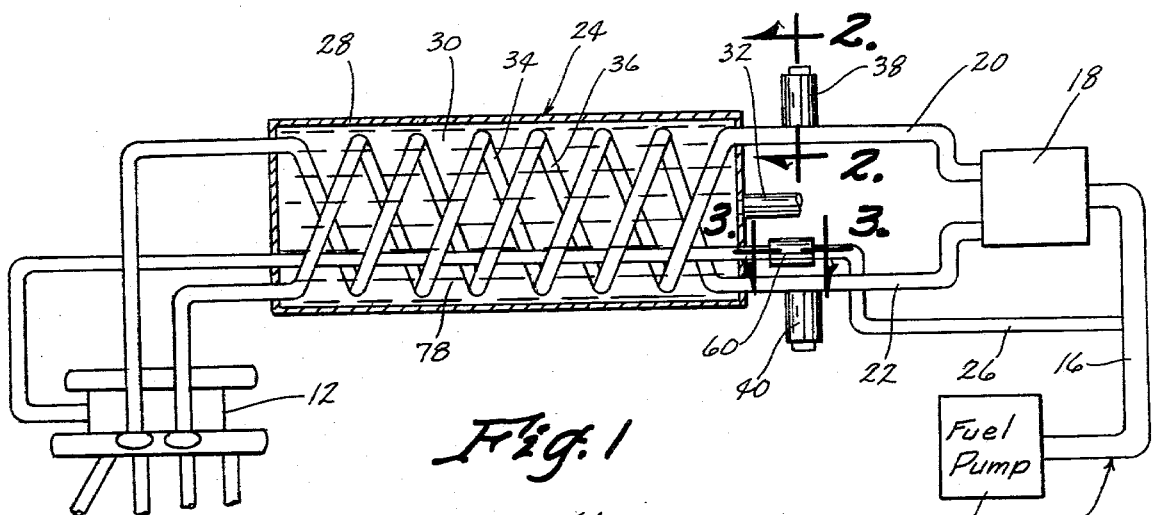
FIG. 1 is a schematic fluid circuit diagram of the fuel system of the invention.

Referring to FIG. 1, the fuel system of the present invention includes a fuel pump 10 adapted for supplying fuel to a carburetor 12 through a fuel line indicated generally at 14. Fuel line 14 includes a first conduit 16 through which fuel is pumped to an atomizer 18. Atomized fuel is then directed outwardly through second and third conduits 20 and 22 through a heater unit 24 and ultimately to the carburetor 12. Alternatively, fuel may be directed through a bypass fuel line 26 directly to the carburetor as described hereinbelow.

The heater unit 24 includes a container 28 which defines a heat chamber 30 therein. In the preferred embodiment shown, a hose 32 communicates with the chamber 30 for directing hot engine coolant through the heat chamber to raise the temperature therein to approximately the temperature of the hot coolant. In other embodiments, the heat chamber may alternately be heated by an electric coil or other suitable means. Note that the second and third conduits include generally helical portions 34 and 36 respectively which are disposed within the heat chamber 30 for substantially increased exposure to the hot fluid therein.

Air orifice valves 38 and 40 are operatively connected to the second and third conduits upstream of the heater unit 24 for controlling the speed of fuel flow through the helical coils 34 and 36. Since both valves 38 and 40 are identical, only valve 38 will be described in detail.

Figure 2:
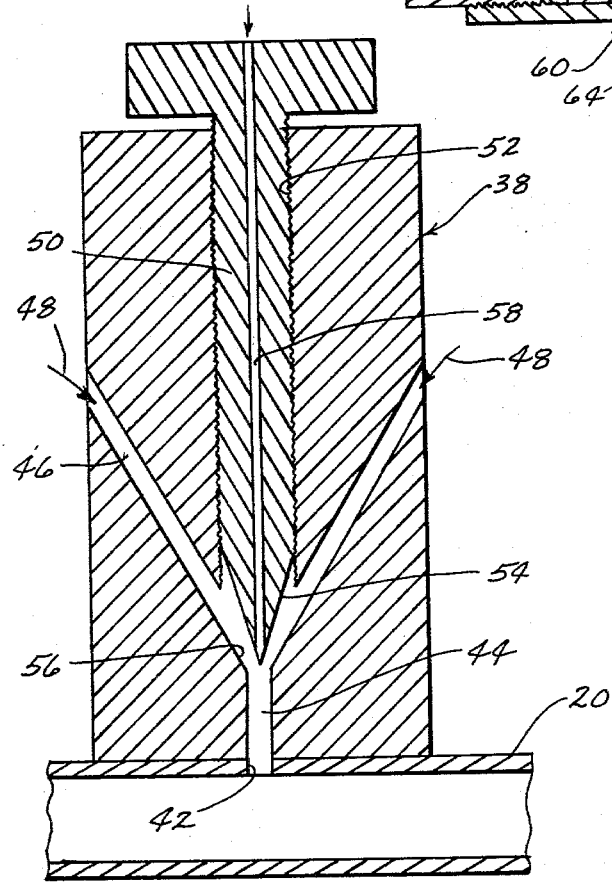
FIG. 2 is a longitudinal sectional view of the air orifice control valve, taken along line 2—2 in FIG. 1.

Referring to FIG. 2, second conduit 20 is provided with an orifice 42 in registration with the throat 44 of valve 38. A pair of upwardly inclined passages 46 provide air flow to the throat 44 as indicated by arrows 48. An elongated needle 50 is threadably received within an upright threaded bore 52 of valve 38 for engagement of the tapered end 54 thereof against the valve seat 56 to block passages 46. Even when needle 50 is lowered to the closed position, an axially extended orifice 58 therethrough provides limited air flow through the valve 38 and air orifice 42.

Figure 3:
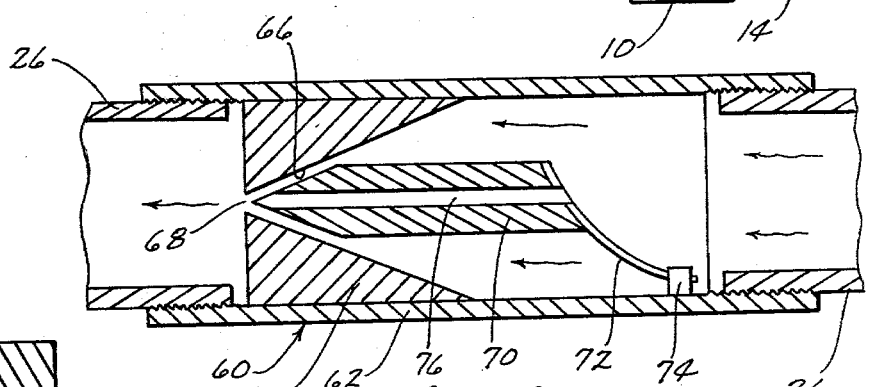
FIG. 3 is an enlarged longitudinal sectional view of the thermally controlled valve on the bypass fuel line of the invention.

A thermally controlled valve 60 is installed along the bypass fuel line 26 for substantially closing the same once the heater unit 24 reaches its operating temperature. In the preferred embodiment shown, the warm up period for the heater unit 24 may be identical to that of the engine generally since the engine coolant fluid provides the source of heat. Referring to FIG. 3, valve 60 includes a generally cylindrical valve body 62 having internally threaded ends for securement to threaded end portions of the bypass fuel line 26. Internal valve block 64 defines a generally conical valve seat 66 surrounding a central orifice 68. A needle 70 is secured to an arcuate spring 72 which is anchored at one end to the valve body 62 by a suitable bracket 74. Spring 72 tends to straighten when it is heated, thereby forcing needle 70 against the valve seat 66. Spring 72 may be comprised of a bi-material element for example. Needle 70 has a small axial bore 76 therethrough which may provide limited fuel flow through the valve 60 even when the needle 70 is seated in a closed position.

In operation, when the engine is cold, the fuel pump 10 forces fuel through first conduit 16 and the bypass fuel line 26 directly to the carburetor 12. This is because the bypass fuel line 26 presents substantially less resistance to fuel flow therethrough as compared to the resistance afforded by atomizer 18 and coil portions 34 and 36. Acoordingly, the engine is initially operated in a generally conventional manner. Bypass fuel line 26 does however pass through the heater unit 24 so as to gain some advantage by heating the fuel in the bypass fuel line as the fluid 78 is increasing in temperature. When the engine warms up and the heater unit 24 attains a predetermined temperature of approximately 185° Farenheit, the thermally controlled valve 60 is heated by conduction through the bypass fuel line 26 with the result that spring 72 begins to straighten and thereby force needle 70 to its closed position.

Fuel flow is then directed through first conduit 16 to atomizer 18 for the delivery of atomized fuel through second and third conduits 20 and 22 past the air orifice valves 38 and 40, through the heater unit 24 and to the carburetor 12. The atomized fuel is vaporized within the hot coils 34 and 36 in the heater unit 24 prior to introduction to the carburetor. In an eight cylinder engine, second and third conduits 20 and 22 communicate with separate chambers of carburetor 12 so that one conduit serves the odd cylinders and the other conduit serves the even cylinders. This is necessary so that the first few cylinders do not consume all of the fuel and leave the remaining cylinders fuel starved. In a four cylinder engine, such division is not necessary.

When a surge of power is required such as when starting an automobile from a stopped position or otherwise accelerating, a squirt of raw gas is provided to the carburetor through the bore 76 of thermally controlled valve 60, even when in its closed position. Accordingly, the present invention overcomes the problem of power loss associated with many fuel saving devices. In addition, the air orifice valves 38 and 40 may be manually adjusted when the engine is at idle to positions at which the amount of fuel entering the coils 34 and 36 may be cut down by as much as two thirds. It has been found that the fuel system of the present invention can double or triple the gas milage of an automobile on which it is installed.

Thus there has been shown and described a fuel system for an internal combustion engine which accomplishes at least all of the stated objects.

I claim:

1. In the fuel system of an internal combustion engine including a fuel pump for supplying fuel to a carburetor through a fuel line, the improvement comprising, heater means for heating said fuel line at a position intermediate said fuel pump and carburetor, said fuel line including an air orifice at a position upstream of said heater means, means for adjusting air flow through said orifice, a bypass fuel line having one end in communication with said fuel line upstream of said air orifice and an opposite end in communication with said carburetor for supplying fuel thereto, and a thermally controlled valve interposed along said bypass fuel line, said thermally controlled valve being in thermal communication with said heater means so as to close when the temperature of said heater means is above a predetermined temperature and to open when the temperature of said heater means is below said predetermined temperature, said valve including an orifice therethrough which is adapted to provide limited fuel flow through said valve in both the closed and open positions therefor.

2. The improvement of claim 1 wherein said thermally controlled valve includes a valve housing in thermal communication with said bypass fuel line, said bypass fuel line being in thermal communication with said heater means whereby said thermally controlled valve is heated by conduction through said bypass fuel line.

3. The improvement of claim 1 wherein said thermally controlled valve comprises a needle valve including a spring mounted needle, said spring being movable to close said needle valve in response to an increase in temperature and to open said needle valve in response to a decrease in temperature.

4. The improvement of claim 1 wherein said means for adjusting air flow through said air orifice comprises a needle valve including an adjustable needle having an elongated orifice therethrough which is adapted to provide limited air flow through said needle valve in both the closed and open positions therefor.

5. The improvement of claim 1 further comprising an atomizer interposed along said fuel line intermediate said air orifice and fuel pump.

6. The improvement of claim 5 wherein said fuel line includes a pair of branch lines in communication with said atomizer at one end for receiving atomized fuel therefrom and in communication with said carburetor at the other end thereof, each branch line being in thermal communication with said heater means and including an air orifice at a position upstream of said heater means.

7. The improvement of claim 1 wherein said heater means comprises a container defining a heat chamber therein and means for elevating the temperature within said chamber when the engine is operating.

8. The improvement of claim 7 wherein said means for elevating the temperature within said chamber comprises means for directing engine coolant fluids through said chamber.

9. The improvement of claim 7 wherein said fuel line passes through said heat chamber.

10. The improvement of claim 9 wherein said fuel line includes a plurality of bends within said heat chamber.

* * * * *